United States Patent
Ruffing et al.

(10) Patent No.: US 8,159,094 B2
(45) Date of Patent: Apr. 17, 2012

(54) ELECTRIC MOTOR HAVING FLUID CIRCULATION SYSTEM AND METHODS FOR COOLING AN ELECTRIC MOTOR

(75) Inventors: Stephen M. Ruffing, Florissant, MO (US); Ronald W. Schmidt, St. Louis, MO (US); Kenneth R. Friedman, Smithton, IL (US)

(73) Assignee: Nidec Motor Corporation, St. Louis, MO (US)

(*) Notice: Subject to any disclaimer, the term of this patent is extended or adjusted under 35 U.S.C. 154(b) by 186 days.

(21) Appl. No.: 12/402,138

(22) Filed: Mar. 11, 2009

(65) Prior Publication Data
US 2010/0231067 A1    Sep. 16, 2010

(51) Int. Cl.
*H02K 9/04* (2006.01)
*H02K 9/06* (2006.01)

(52) U.S. Cl. .......... 310/61; 310/52; 310/58; 310/53; 310/400; 310/433; 310/62; 310/63

(58) Field of Classification Search .......... 310/400–433, 310/52–54, 58–63, 270; *H02K 9/04, 9/06*
See application file for complete search history.

(56) References Cited

U.S. PATENT DOCUMENTS

| | | | | |
|---|---|---|---|---|
| 2,292,167 A | * | 8/1942 | Smith | 310/212 |
| 4,301,386 A | * | 11/1981 | Schweder et al. | 310/59 |
| 4,492,088 A | * | 1/1985 | Ibrahim et al. | 62/50.7 |
| 5,889,342 A | * | 3/1999 | Hasebe et al. | 310/54 |
| 5,925,960 A | * | 7/1999 | Hayes | 310/211 |
| 6,026,721 A | * | 2/2000 | Fukai | 83/39 |
| 6,472,782 B1 | * | 10/2002 | Selci | 310/63 |
| 7,345,385 B2 | * | 3/2008 | Kreitzer | 310/59 |
| 2001/0006316 A1 | * | 7/2001 | Berger | 310/261 |
| 2003/0048031 A1 | * | 3/2003 | Dunlap et al. | 310/254 |
| 2003/0057801 A1 | * | 3/2003 | Zeller et al. | 310/270 |
| 2006/0226717 A1 | * | 10/2006 | Nagayama et al. | 310/58 |
| 2007/0120428 A1 | | 5/2007 | Pfannschmidt | |
| 2010/0090561 A1 | * | 4/2010 | Leroy et al. | 310/216.114 |

FOREIGN PATENT DOCUMENTS

DE    EP0585644    * 3/1994

OTHER PUBLICATIONS

Machine translation of EP0585644, Altmann, Mar. 1994.*

* cited by examiner

*Primary Examiner* — Quyen Leung
*Assistant Examiner* — Terrance Kenerly
(74) *Attorney, Agent, or Firm* — Senniger Powers LLP (57) ABSTRACT

An electric motor having a housing, a stator mounted in the housing, and a rotor mounted in the housing for rotation relative to the stator about a central axis. A plurality of fluid flow passages extend through the rotor between opposite ends. An electro-magnetic drive system is adapted for driving rotation of the rotor relative to the stator. A fluid circulation system is in fluid communication with the fluid flow passages for providing fluid flow from the first end of the rotor to the second end of the rotor through at least one of the fluid flow passages and fluid flow from the second end of the rotor to the first end of the rotor through at least one other of the fluid flow passages. The rotor and components of the fluid circulation can be assembled to make a rotor assembly.

18 Claims, 10 Drawing Sheets

ELECTRIC MOTOR HAVING FLUID CIRCULATION SYSTEM AND METHODS FOR COOLING AN ELECTRIC MOTOR

FIELD OF INVENTION

The present invention relates generally to electric motors, and more particularly to systems and methods for cooling an electric motor.

BACKGROUND

Electric motors generally include a stator and rotor mounted for rotation relative to the stator. An electromagnetic drive system including a plurality of magnets and/or electromagnets on the rotor and stator is used to drive rotation of the rotor relative to the stator. The rotor is connected to an output shaft so that as the drive system rotates the rotor the output shaft rotates. Operation of the motor, particularly under a load, generates heat. In some cases, one end of the motor (e.g., the driving end) reaches a higher temperature than the other due to this heat generation. The electromagnetic drive system also generates heat. Heat associated with operation of the motor can promote premature breakdown of lubricants (e.g., in the bearings), damage the electromagnetic drive system, and otherwise interfere with desired operation of the motor.

Some electric motors include passive cooling features, such as cooling fins and the like, to facilitate heat transfer out of the motor. Some electric motors include active cooling systems, such as a forced air ventilation systems. For example, a fan can be attached to the output shaft so rotation of the output shaft rotates the fan to generate air flow to cool the motor. Active cooling systems and passive cooling features such as cooling fins can be used in combination.

A motor's stator and rotor are commonly mounted in a housing. The housing provides a frame for anchoring the mounted rotor and stator and holding the stator fixed relative to the housing. The housing can also be a barrier preventing people (or other objects) from contacting parts of the motor inside the housing. In some cases the stator and rotor are totally enclosed by and sealed within the housing in order to limit the potential for dust and other debris to interact with the rotor or stator and thereby interfere with operation of the motor. A fan can be used to cool a totally enclosed motor (e.g., by directing air over the housing), in which case the motor may be referred to as Totally Enclosed Fan-Cooled (TEFC). The drive end of a TEFC motor is typically hotter than the opposite end because the fan is installed opposite the drive end. Sometimes, an internal air circuit is used to improve heat distribution in the motor by interchanging air from one end of the motor to the other. For example, in one conventional TEFC motor, a fan pumps air from one end of the housing to the other through passages in the rotor. Air is returned to the first end of the housing through passages in the stator and/or housing.

SUMMARY

In one embodiment, an electric motor includes a housing and a stator mounted in the housing. A rotor is mounted in the housing for rotational movement relative to the stator about a central axis. The rotor has first and second opposite ends and a plurality of fluid flow passages through the rotor between the first and second ends. An electro-magnetic drive system is adapted to drive rotation of the rotor relative to the stator. A fluid circulation system is adapted to produce fluid flow in the housing. The fluid flow includes fluid flow from the first end of the rotor to the second end of the rotor through at least one of the fluid flow passages and fluid flow from the second end of the rotor to the first end of the rotor through at least one other of the fluid flow passages.

Another aspect of the invention is a rotor assembly for an electric motor. The rotor assembly includes a rotor having a central axis and first and second opposite ends. The rotor defines at least in part a plurality of openings at each end and a plurality of fluid flow passages between the first and second ends. Each of said fluid flow passages extends between at least one of said openings at the first end and at least one of said openings at the second end. A hub is fixedly secured to the rotor adjacent one of the first and second ends. The hub includes an outward-facing surface having one or more outward-facing channels and an inward-facing surface defining at least in part one or more conduits through the hub. The conduits and outward-facing channels are aligned with and adjacent a respective one of said openings. The assembly has an impeller having a peripheral edge margin, an inlet radially inward from the peripheral edge margin, and an outlet radially outward from the inlet. The impeller is fixedly secured to at least one of the hub and the rotor and adapted to propel a fluid radially outward from the inlet to the outlet when the rotor assembly is rotated about said central axis. The impeller is positioned relative to the hub so the outward-facing channel of the hub is adjacent the impeller inlet and the inward-facing surface of the conduit substantially prevents fluid flow directly to the impeller inlet from the opening that is aligned with the conduit.

Another aspect of the invention is a method of cooling an electric motor having a housing, a stator in the housing, a rotor having first and second opposite ends mounted in the housing for rotational movement relative to the stator, and an electro-magnetic drive system adapted to drive rotation of the rotor relative to the stator. A fluid is pumped from the first end of the rotor through a first fluid flow passage through the rotor to the second end of the rotor. The fluid is pumped from the second end of the rotor through a second fluid flow passage in the rotor to the first end of the rotor.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
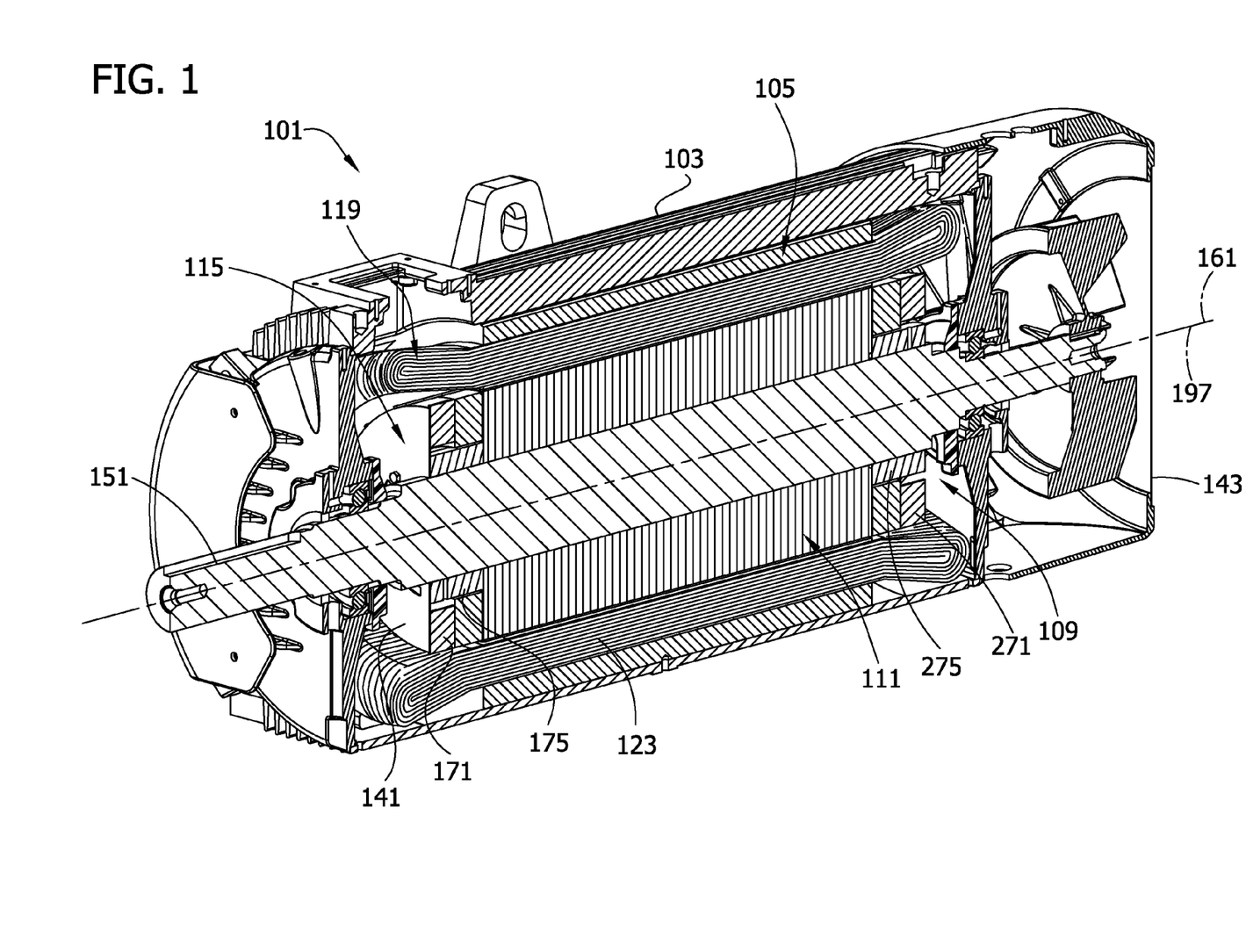
FIG. 1 is a perspective illustrating one embodiment of a motor of the present invention in cross section.
Figure 2:
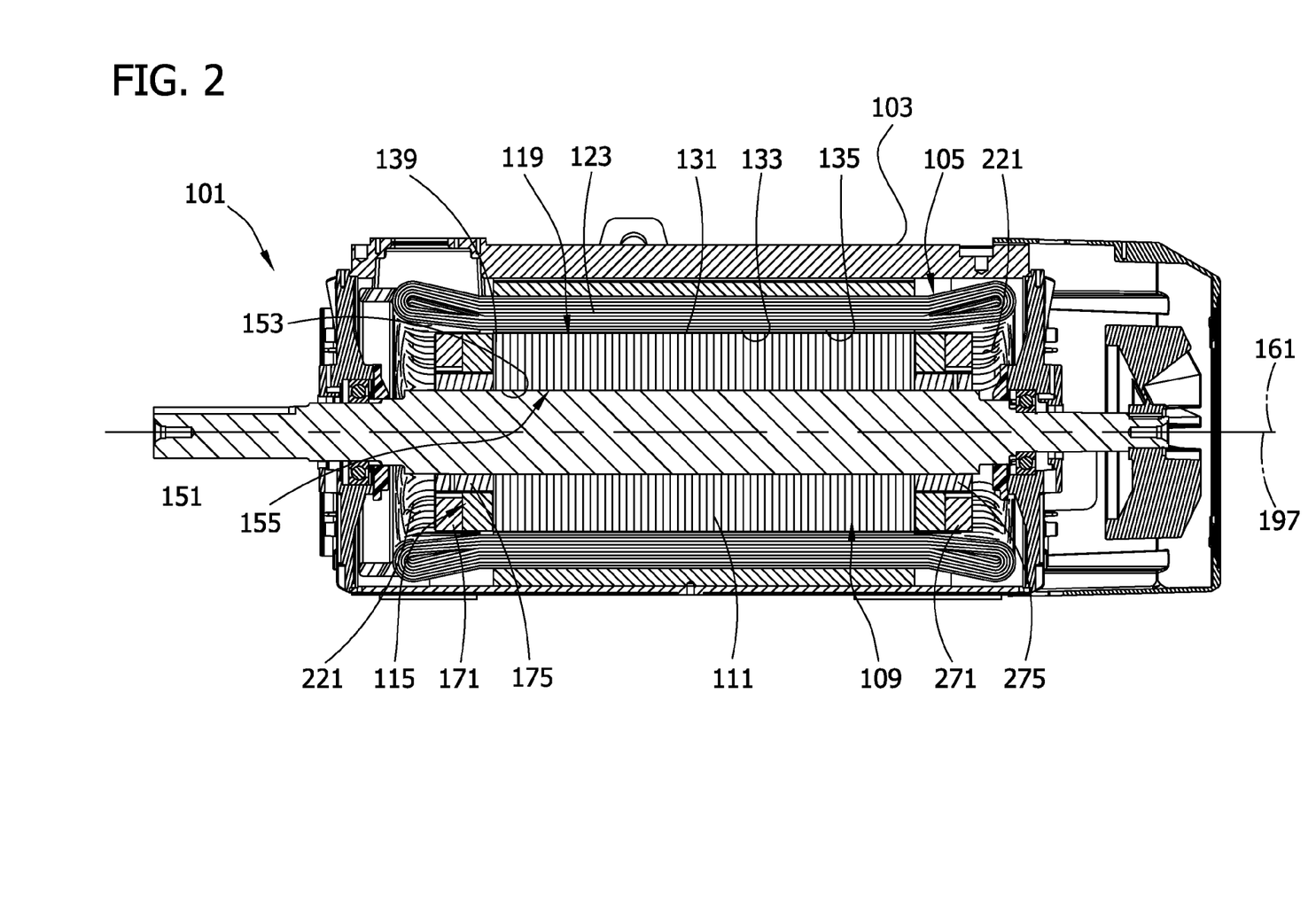
FIG. 2 is an elevation of the motor in cross section.

Referring to the drawings, first to FIGS. 1 and 2 in particular, one embodiment of an electric motor of the present invention, generally designated 101, is depicted as a totally enclosed fan-cooled (TEFC) electric motor. The motor 101 includes a housing 103, a stator 105 mounted in the housing, and a rotor assembly 109 mounted in the housing for rotation relative to the stator. In this embodiment, the rotor assembly 109 includes a rotor 111 and components of a fluid circulation system 115 for cooling at least some parts of the motor 101 as described in more detail below.

Figure 3:
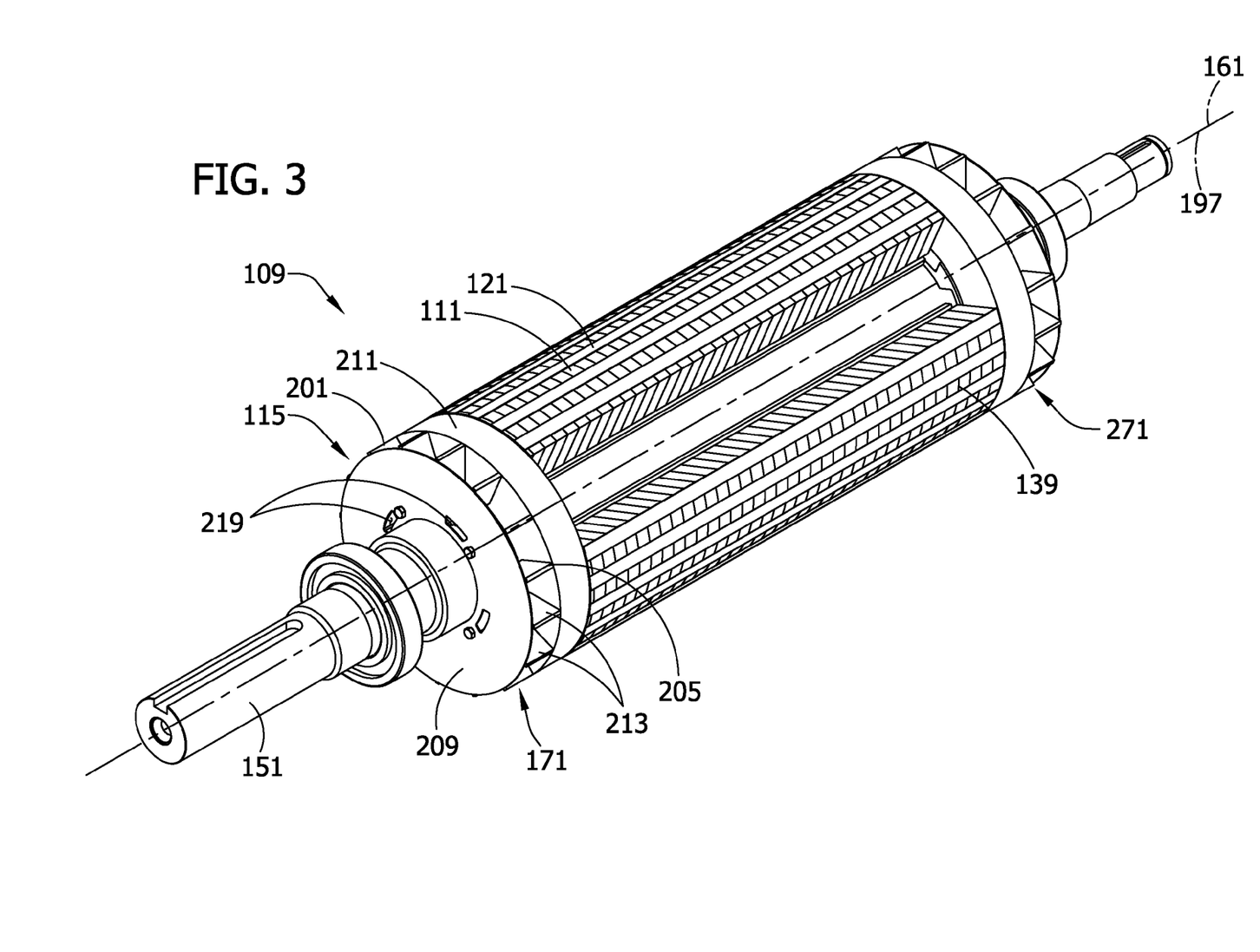
FIG. 3 is a perspective of a rotor assembly of the motor with parts removed to illustrate bi-directional fluid flow through the rotor.

The motor 101 has an electromagnetic drive system 119 operable to drive rotation of the rotor 111. Generally, the electromagnetic drive system includes a plurality of magnets and/or electromagnets on or in the rotor 111 and stator 105 and arranged so electromagnetic forces can be produced by the drive system to drive rotation of the rotor relative to the stator. Various electromagnetic drive systems can be used within the scope of the invention. In the illustrated embodiment, for example, the rotor assembly 109 is received in a generally cylindrical cavity 135 in the stator 105 so the stator substantially surrounds the circumference of the generally cylindrical rotor assembly. The stator 105 includes a plurality of electromagnets 123 spaced circumferentially around the cavity 135. The rotor 111 includes a plurality of laminated disks 139 stacked together and collectively extending generally between first and second opposite axial ends 141, 143 of the rotor. Electromagnets 121 (FIG. 3) are spaced circumferentially around the rotor 111 at an outer cylindrical surface 131 of the rotor opposing the inner cylindrical cavity-defining surface 133 of the stator 105. The electromagnets 121, 123 are energized at appropriate times to interact in a way that drives rotation of the rotor 111. This electromagnetic drive system 119 is well-known in the art and will not be discussed in further detail herein.

The rotor 111 is connected to an output shaft 151 so the output shaft rotates as the drive system 119 drives the rotor. In the illustrated embodiment, the output shaft 151 is received in a central opening 153 defined by an inner generally cylindrical surface 155 of the rotor 111. The output shaft 151 is fixedly secured to the rotor 111. Various techniques and structures that are well-known in the art are suitable for fixedly securing the output shaft 151 to the rotor 111. Thus, the connection of the output shaft to the rotor will not be discussed in any further detail herein.

The housing 103 is suitably a conventional motor housing. The housing 103 can be constructed of plastic, metal, or any other suitable material. In the embodiment shown in the drawings, the stator 105 and rotor assembly 109 are totally enclosed by and sealed in the housing 103. Thus, the housing 103 limits the potential for ambient dust and debris outside the housing to interact with the rotor 111, stator 105, or any other parts of the motor 101 inside the housing. Accordingly, the motor 101 of the illustrated embodiment is resistant to the effects of dust and debris in the environment. However, it is possible that the housing only partially encloses or does not enclose the rotor assembly 109 and stator 105 therein within the scope of the invention. The stator 105 is secured to the housing 103 in a manner that limits rotation of the stator relative to the housing. The rotor assembly 109 is mounted in a manner that allows the rotor 111 to rotate relative to the stator 105 (and the housing 103) on a central axis 161 of the rotor. Various techniques and structures that are well known in the art can be used to mount the rotor assembly 109 and stator 105 in the housing 103. Thus, these techniques and structures will not be described in any further detail.

Figure 4:
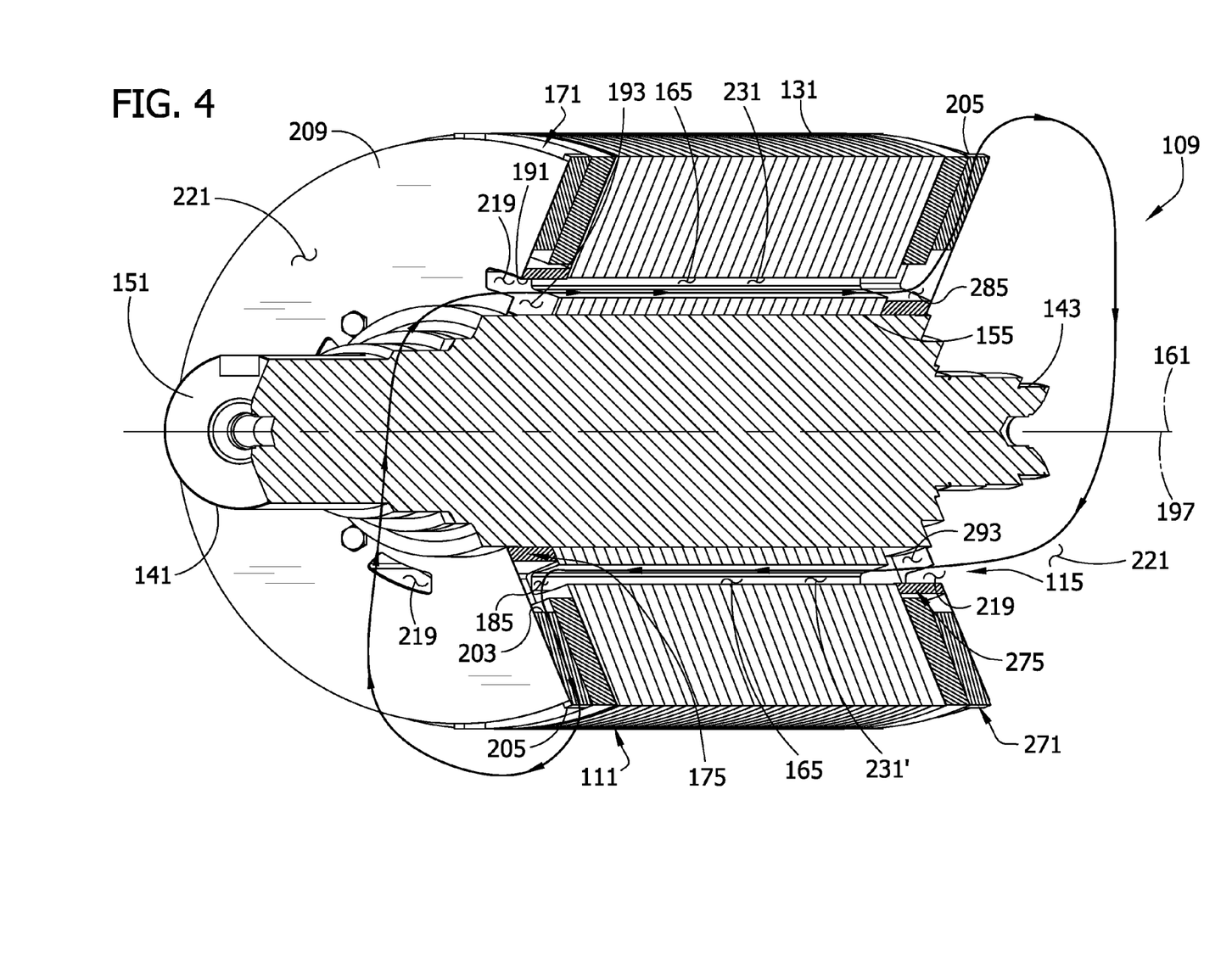
FIG. 4 is a perspective of the rotor assembly sectioned along planes including the lines 4-4 on FIG. 6 and illustrating one of multiple possible paths for fluid flow back and forth through the rotor.

The motor 101 includes a fluid circulation system 115 adapted to produce fluid flow (e.g., air flow) through the rotor assembly 109 to cool at least parts of the motor. As best illustrated in FIG. 4, the fluid circulation system 115 is operable to produce bi-directional fluid flow through the rotor 111 including fluid flow through the rotor from the first end 141 to the second end 143 and return fluid flow through the rotor from the second end to the first end. Because of the bi-directional fluid flow through the rotor 111, fluid flow passages through the stator and/or housing are not needed to establish a complete fluid circuit in the motor 101. As illustrated in FIGS. 1 and 2, for example, the housing 103 and stator 105 are substantially devoid of fluid flow passages that communicate with the fluid circulated by the fluid circulation system 115.

Figure 5:
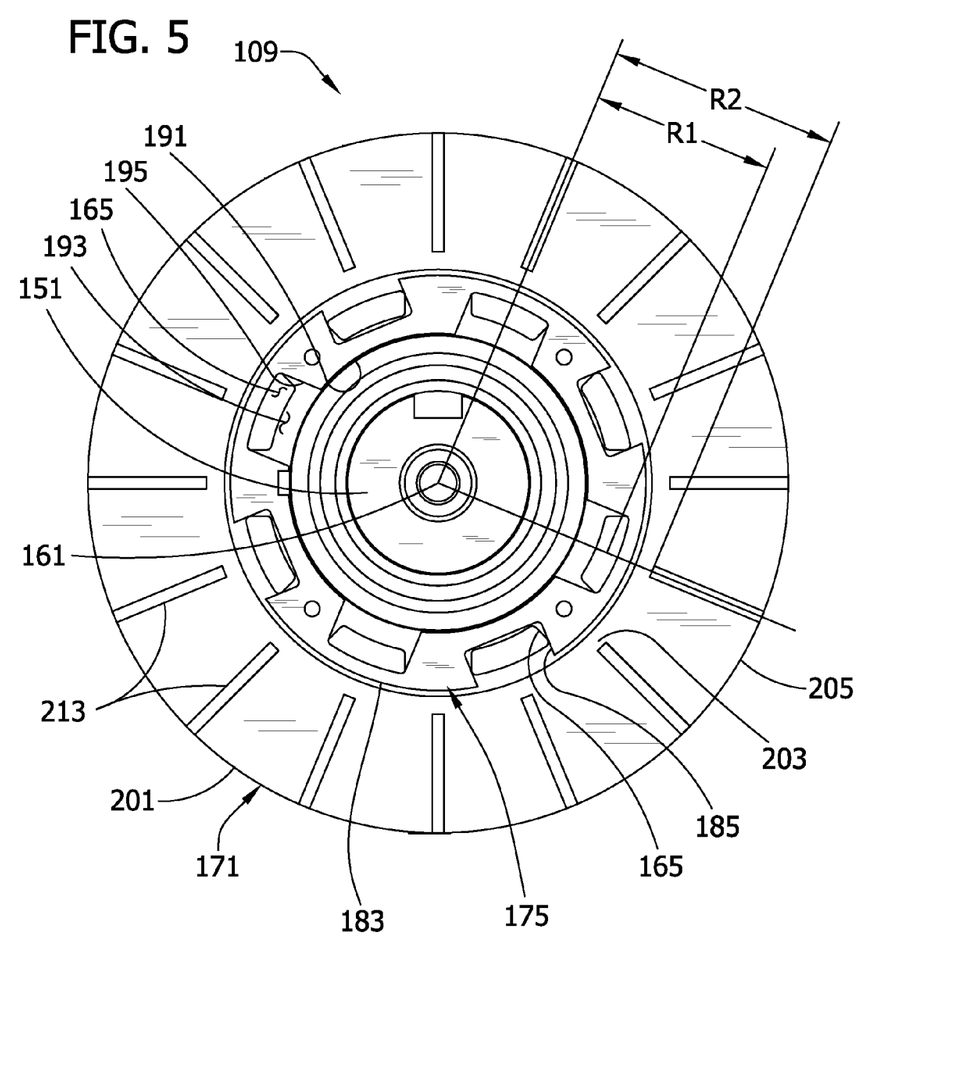
FIG. 5 is a side elevation of the rotor assembly with an end plate removed to show blades of an impeller and fluid flow passages through the rotor.
Figure 6:
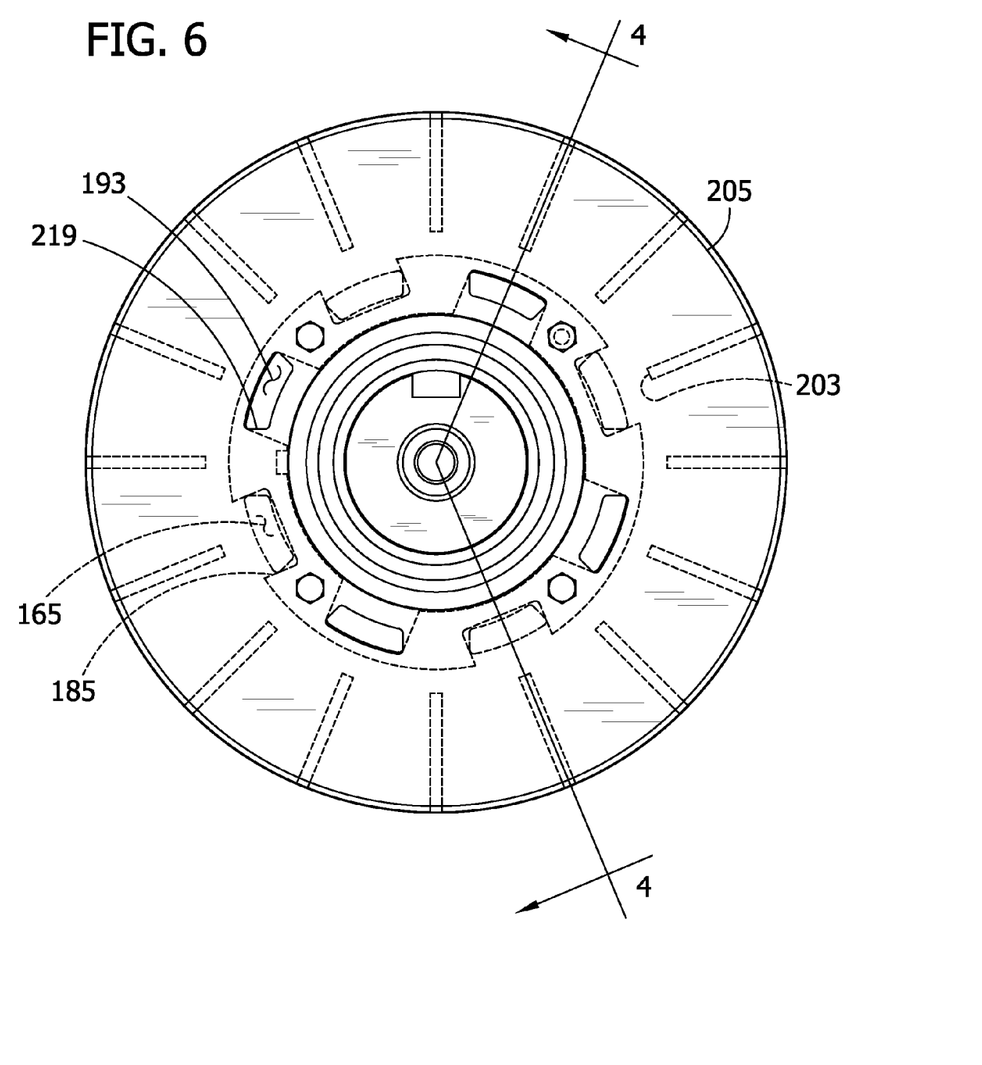
FIG. 6 is a side elevation similar to FIG. 5, but including the end plate.

Referring now to FIGS. 4-6, the rotor 111 in this embodiment includes a plurality of fluid flow passages 165 defined at least in part by the rotor and extending through the rotor between its axial ends 141, 143. The fluid circulation system in this embodiment includes an impeller 171 for driving flow of the fluid through the passages 165. A hub 175 and end plate 209 are adapted to produce the bi-directional flow of fluid through the rotor 111 in a manner described in more detail below. In this embodiment, the impeller 171 and hub 175 are secured to the working end 141 of the rotor 111. The rotor 111, hub 175 and impeller 171 can be assembled into a rotor assembly 109 of the present invention that is later combined with other components of the motor 101 to complete assembly of the motor. However, it is understood that the impeller 171 and/or hub 175 can be assembled with other parts of the motor 101 and arranged in different ways relative to the rotor without departing from the scope of the present invention.

The fluid flow passages 165 extend axially through the rotor 111 between openings 179 at the ends 141, 143 of the rotor 111. The number of passages 165 can vary within the scope of the invention. As best illustrated in FIGS. 5 and 6, for example, this embodiment of the rotor 111 has eight fluid flow passages 165. The fluid flow passages 165 are radially inward from the outer surface 131 of the rotor. The fluid flow passages 165 of this embodiment are also radially outward from the inner surface 155 of the rotor 111, as illustrated in FIG. 4. At least some of the fluid flow passages 165 (e.g., all of them) are suitably closer to the inner surface 155 of the rotor 111 than the outer surface 131 of the rotor. Accordingly, at least some of the fluid flow passages 165 are suitably closer to the output shaft 151 than they are to the stator 105. In the illustrated embodiment, each of the fluid flow passages 165 is spaced from the central axis 161 of the rotor 111 about the same distance R1 (FIG. 5) as the other fluid flow passages. The fluid flow passages 165 of this embodiment are spaced angularly (e.g., equi-angularly) about the central axis 161 of the rotor 111.

The fluid flow passages 165 are suitably defined entirely by the rotor 111 (e.g., by aligned openings in the laminated disks), as illustrated in FIG. 4. It is understood, however, that one or more of the fluid flow passages 165 may be bounded by the output shaft 151 without departing from the scope of the invention. For example, a fluid flow passage may be defined by a radially inward-facing channel in the inner cylindrical surface of the rotor (e.g., a channel formed by aligned notches in the inner edges of the laminated disks) adjoining the output shaft 151 so flow of fluid out of the open inward side of the channel is prevented by the output shaft.

Figure 10:
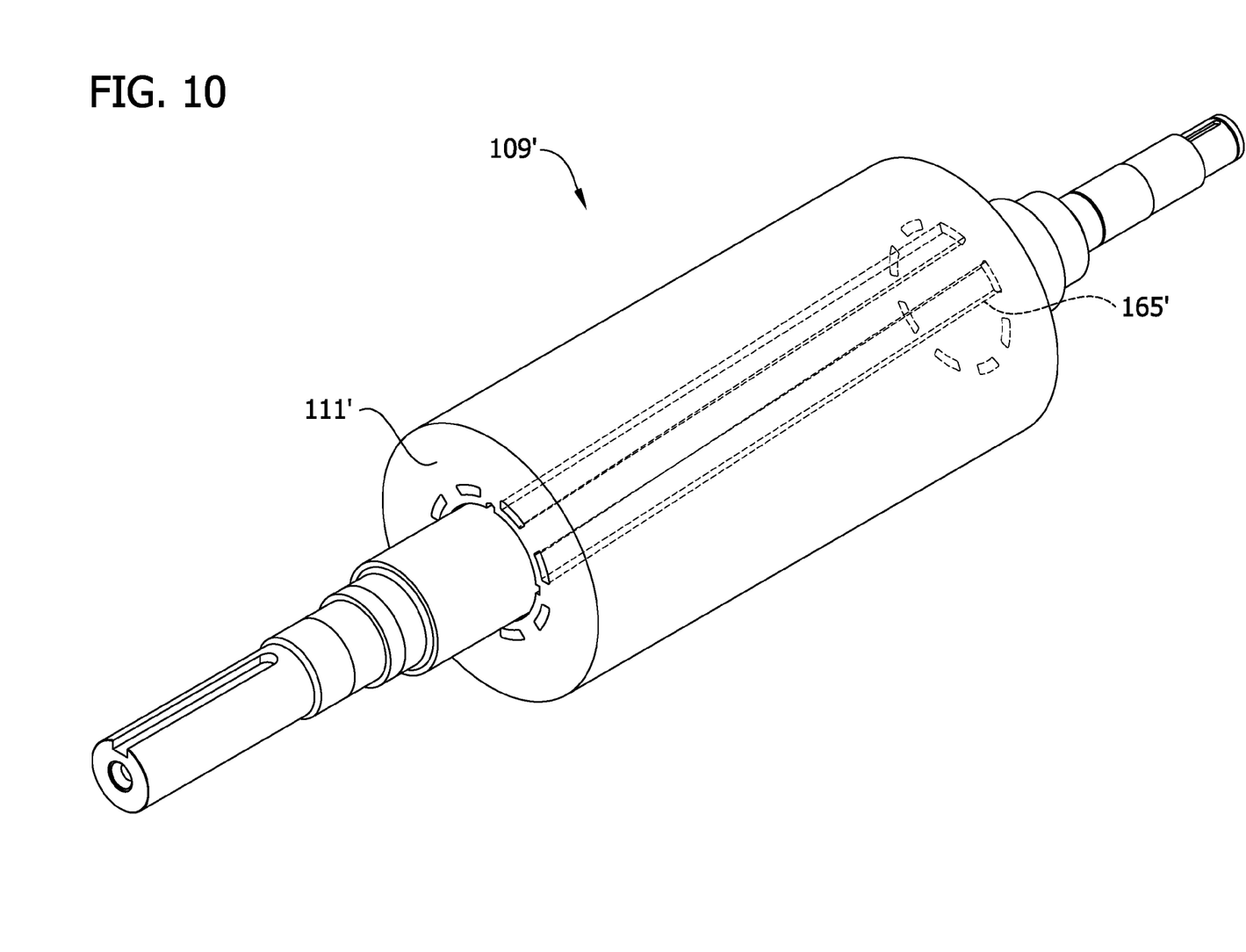
FIG. 10 is a perspective of another embodiment of a rotor assembly.

In the illustrated embodiment, each fluid flow passage 165 is a separate fluid flow passage and is substantially parallel to the central axis 161 of the rotor 111. It is understood, however, that the fluid flow passages can have other configurations within the scope of the invention, including configurations in which the passages have different shapes and/or orientations from those of the illustrated embodiment. As illustrated in FIG. 10, for example, the rotor assembly 109' can include a rotor 111' that has helical passages 165'. The helical passages 165' (only two of which are shown in FIG. 10) can be produced by skewing the rotor laminations so each lamination is angularly displaced from the adjacent laminations. It is also possible that some of the fluid flow passages are interconnected with other fluid flow passages inside the rotor instead of being separate passages without departing from the scope of the invention.

Figure 7:
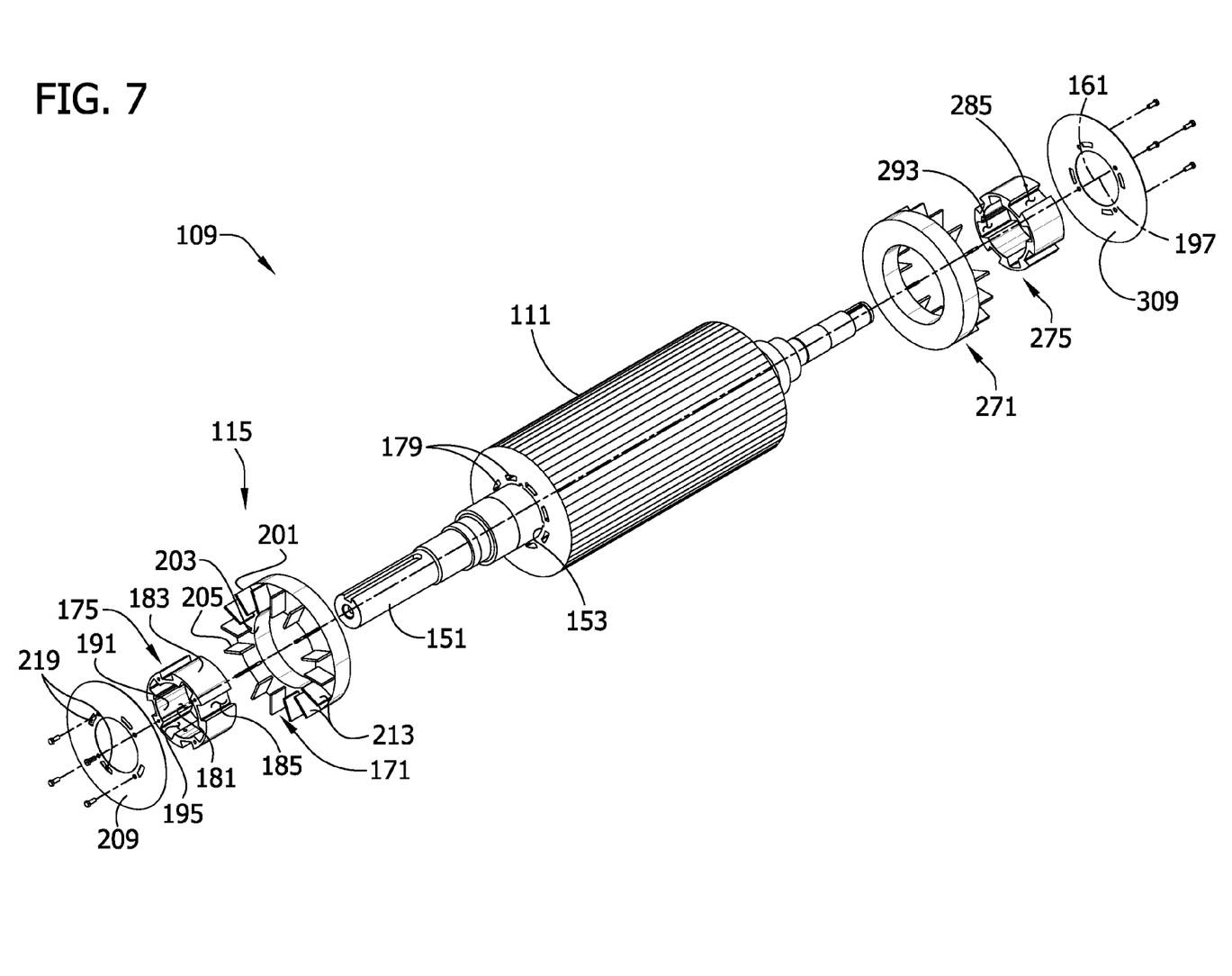
FIG. 7 is an exploded perspective of the rotor assembly.
Figure 8:
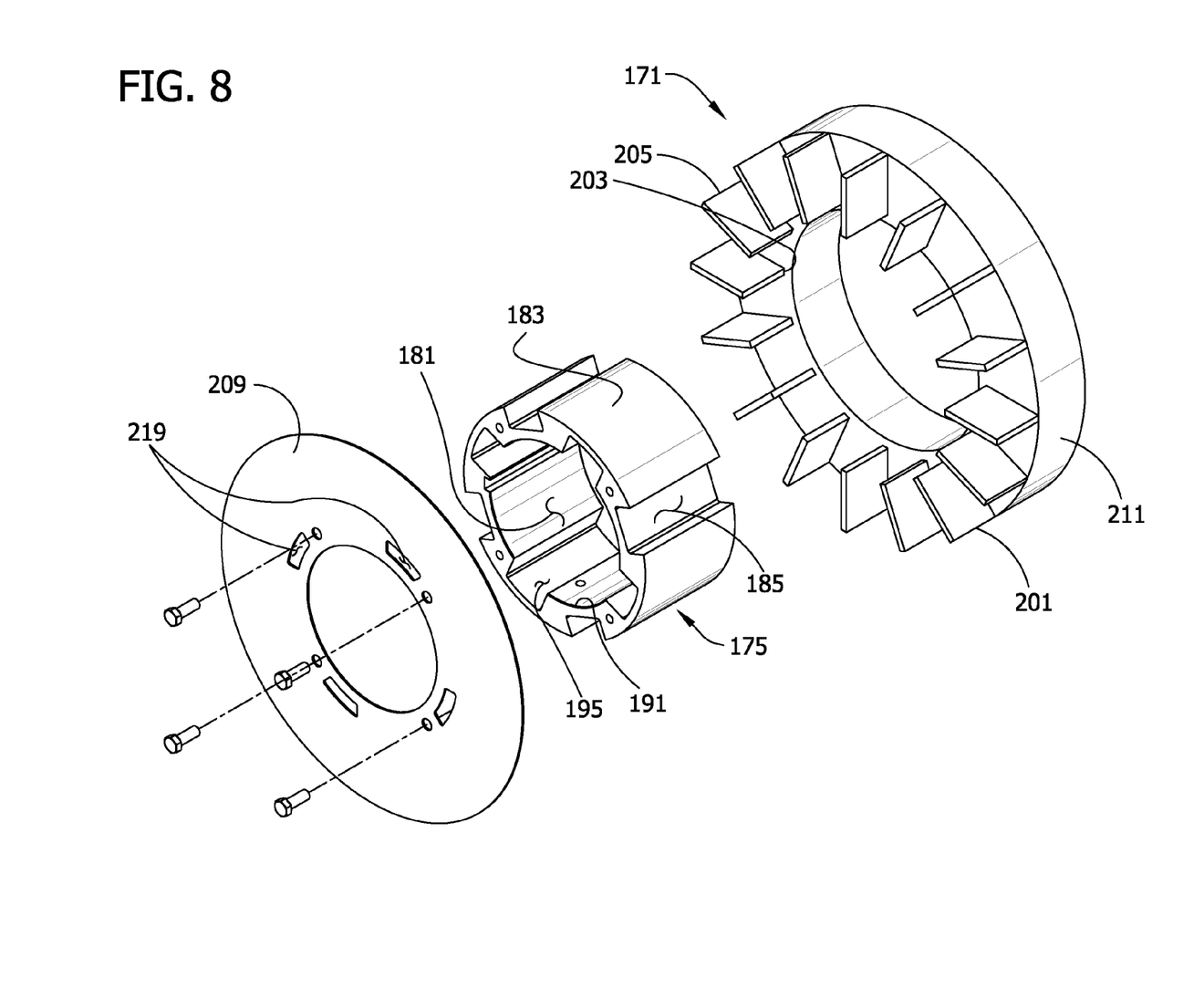
FIG. 8 is an exploded perspective of components of a fluid circulation system of the rotor assembly.
Figure 9:
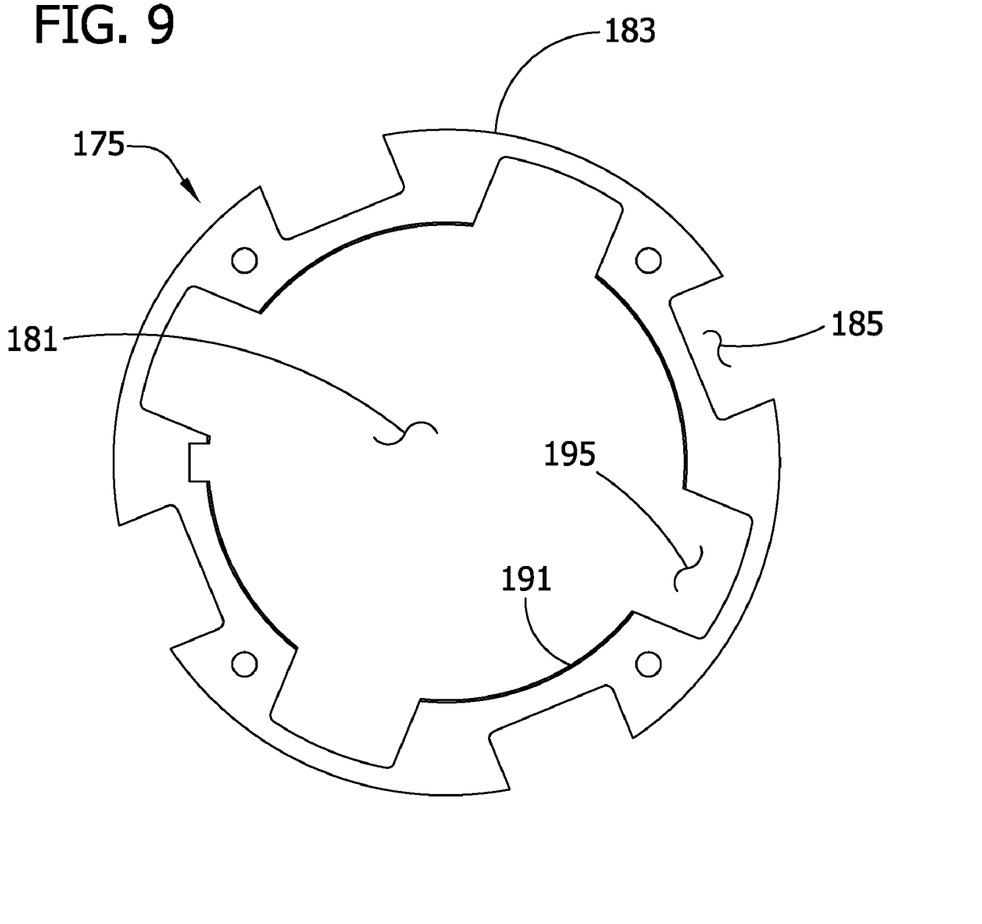
FIG. 9 is a side elevation of a hub of the fluid circulation system.

The output shaft 151 is received in a central opening 181 in the hub 175, which is secured to the output shaft 151 adjacent an axial end or the rotor 111. As illustrated in FIGS. 7-9, the hub 175 has an outward-facing surface 183 having at least one outward-facing channel 185 in it. The channel 185 has an outward-facing opening (e.g., open side) allowing fluid in the channel to flow radially outward out of the channel. The channel 185 is aligned with one of the openings 179 so that fluid can flow from the respective fluid flow passage 165 into the channel. The hub 175 in the illustrated embodiment has a plurality of outward-facing channels 185 (e.g., four), each of which is aligned with a respective opening 179 of the fluid flow passages 165. However the number of outward-facing channels in the hub can vary within the scope of the invention.

The hub 175 also has an inward-facing surface 191 that defines, at least in part, one or more conduits 193 (FIGS. 5 and 6) extending axially through the hub. Each of the conduits 193 is aligned with another of said plurality of openings 179. The conduits 193 are suitably substantially parallel to the central axis 161 of the rotor 111. In the illustrated embodiment, the conduits 193 are defined in part by inward-facing channels 195 in the hub 175 and in part by the output shaft 151, which is positioned to substantially prevent flow of fluid out of the open side of the channels. However, the conduits can be defined entirely by the hub within the scope of the invention.

The impeller 171 is mounted in the housing 103 for rotation relative to the stator 105 on a central axis 197. In the case of a squirrel-cage induction motor, the impeller can include the typical rotor end ring and fan blade construction. As indicated in FIG. 8, the impeller 171 has a peripheral edge margin 201, an inlet 203 positioned radially inward from the peripheral edge margin, and an outlet 205 positioned radially outward from the inlet. The impeller 171 in this embodiment is mounted coaxially with the rotor 111 so the central axis 161 of the rotor coincides with the central axis 197 of the impeller. The impeller 171 includes an end plate 209 extending radially from the central axis 197, an end ring 211, and a plurality of blades 213 extending both axially between the end plate and the end ring and radially away from the central axis 197. The blades 213 are suitably secured to the plate 209 and end ring 211 so they all rotate together. The blades 213 are suitably spaced angularly (e.g., evenly spaced) from one another about the central axis 197. The blades 213 in the illustrated embodiment are suitably substantially identical to one another and spaced substantially uniformly from the central axis 197 of the impeller 171 by a distance R2 (FIG. 5) that is larger than the distance R1 between the fluid flow passages 165 and the central axis 161 of the rotor 111. The impeller inlet 203 is generally positioned at the inner edges of the blades 213 and the impeller outlet 205 is generally positioned at the outer edges of the blades.

The impeller 171 is suitably secured to the rotor 111 and/or hub 175 so the rotor, hub, and impeller all rotate together. The end ring 211 is adjacent the rotor 111 and extends circumferentially around a portion of the hub 175 adjacent the rotor. Electrical current that energizes the electromagnets 121 in the rotor 111 is conducted through the end ring 211. The end ring 211 in the illustrated embodiment is positioned to substantially prevent flow of fluid out of the outward-facing channels 185 adjacent the rotor 111. The end plate 209 is adjacent the end of the hub 175 opposite the rotor 111 and seals the axial ends of the outward-facing channels 185 opposite the rotor. The end plate 209 has openings 219 aligned with the conduits 193 so fluid can flow into the conduits from a free space 221 in the housing 103 at the axial end of the rotor assembly 109. The blades 213 are spaced from the rotor 111 by the end ring 211 and are positioned circumferentially around the portion of the hub 175 opposite the rotor. The impeller can have various constructions within the scope of the invention. For example, in the case of a squirrel-cage induction motor, the impeller can have a typical rotor end-ring and fan blade construction.

The impeller 171 is positioned to draw fluid from some of the fluid flow passages 165 into the impeller inlet 203. The impeller 171 draws the fluid by propelling fluid from the inlet 203 radially outward to the outlet 205 when the impeller is rotated about its central axis 197. As the impeller 171 draws the fluid into the inlet 203, it produces at least some of the fluid flow through the rotor 111. As best seen in reference to FIG. 4, in this embodiment, one or more of the fluid flow passages 231 (e.g., four of the passages in the illustrated embodiment) is adapted by the hub 175 to convey the fluid from the first end 141 of the rotor to the second end 143 while one or more other fluid flow passages 231' (e.g., four of the passages) is adapted by the hub to convey the fluid in a generally opposite direction from the second end back to the first end. The outward-facing channels 185 of the hub 175 in this embodiment are adjacent the impeller inlet 203. The hub 175 provides direct fluid communication between the impeller inlet 203 and the openings 179 of the fluid flow passages 231' that are aligned with the outward-facing channels 185. When the impeller 171 rotates, it draws fluid from the fluid flow passages 231' that are aligned with the outward-facing channels 185 toward the impeller.

The inward-facing surface 191 of the hub 175 substantially prevents direct flow of fluid from the openings 179 that are aligned with the conduits 193 through the hub to the impeller inlet 203. The conduits 193 are in direct fluid communication with the impeller outlet 205 via the free space 221 in the housing 103 axially outward from the rotor assembly 109. Accordingly, when the impeller 171 rotates, fluid flows from the outlet 205 (via spaces between the end turns of the stator windings, the free space 221 and conduits 193) into the fluid flow passages 231 aligned with the conduits and flows away from the impeller in the passages. Although the number of fluid passages 231 in the illustrated embodiment for conveying fluid from the first end 141 of the rotor to the second end 143 is equal to the number of fluid passages 231' for conveying fluid from the second end to the first end, it is understood that this is not required to practice the invention. Further, the fluid flow passages can have a helical configuration (e.g., generally aligned with the central axis of the rotor) within the scope of the invention.

In the illustrated embodiment, the motor 101 has another hub 275 and another impeller 271 secured to the end 143 of the rotor opposite the first hub 175 and impeller 171. The additional impeller 271 and hub 275, which are optional, are suitably substantially identical to the first impeller 171 and hub 175 except as noted. Thus, as illustrated in FIG. 7, the additional impeller 271 includes an end plate 309 that is substantially identical to the end plate 209 of the first impeller 171. The fluid flow passages 165 suitably establish fluid communication between the conduits 193 of the first hub 175 and the outward-facing channels 285 of the second hub 275 and between the conduits 293 of the second hub and the outward facing channels 185 of the first hub. In the illustrated embodiment, for example, the hubs 175, 275 have different angular orientations, as best understood in reference to FIG. 7. In particular, the hubs 175, 275 are rotated relative to one another about the central axis 161 of the rotor 111 so the outward-facing channels 185 of the first hub are aligned with the conduits 293 of the second hub and vice-versa. Thus, the impellers 171, 271 cooperate with one another to generate fluid flow through the passages 165 from the conduits 193 of the first hub 175 to the outward-facing channels 285 of the second hub 275 and vice-versa. It is understood, that there are other ways of connecting the conduits of the hubs to the channels of the opposite hub (e.g., via fluid flow passages that are not straight, via fluid flow passages that are not parallel to the central axis of the rotor, or combinations thereof) within the scope of the invention.

When the motor 101 is in use, the electromagnetic drive system 119 causes the rotor 111 to rotate relative to the stator 105 and the housing 103. Because the hub 175, impeller 171, and output shaft 151 are fixedly secured (either directly or indirectly) to the rotor 111, the entire rotor assembly 109 rotates together, driving rotation of the output shaft. The fluid circulation system 115 cools one or more parts of the motor 101 by pumping fluid from the first end 141 of the rotor 111 through some of the fluid flow passages 231 in the rotor to the second end 143 of the rotor, while pumping fluid from the second end of the rotor through other fluid flow passages 231' back to the first end. Thus, during operation of the motor 101, the fluid circulation system 115 continuously circulates fluid through the motor 101 in a closed loop extending between the ends 141, 143 of the rotor assembly 109. Because the motor 101 is totally enclosed in the housing 103, the fluid is protected from contamination by dust and other debris that could interfere with desired operation of the motor.

For example, in one method of the invention, the first end 141 is a relatively warmer end (e.g., a driving end) and the second end 143 is a relatively cooler end (e.g., a non-driving end) and the bi-directional (i.e., two way) circulation of the fluid through the fluid flow passages 165 in the rotor 111 facilitates transfer of heat away from driving end to other parts of the motor. However, the particular cooling needs associated with use of a specific motor may vary from one embodiment and/or application to the next and the invention is not limited to those in which heat is transferred from a relatively warmer driving end to a relatively cooler non-driving end.

The angular spacing of the fluid flow passages 165 about the central axis 161 of the rotor 111 facilitates a more uniform radial distribution of heat flow through the rotor, which helps reduce localized concentrations of heat in the rotor and makes overall heat transfer more efficient. It also results in a more uniform radial distribution of fluid flow through the impeller 171 and through the free space 221 in the housing 103 at the end of the rotor assembly 109, which facilitates efficient flow of fluid through the motor 101. For example, in one method of the invention, the fluid circulation system 115 pumps air through the rotor 111 in each direction at a rate that is suitably at least about 5 m/s.

When introducing elements of the mechanisms herein, the articles "a", "an", "the" and "said" are intended to mean that there are one or more of the elements. The terms "comprising", "including" and "having" and variations thereof are intended to be inclusive and mean that there may be additional elements other than the listed elements. Moreover, the use of "forward" and "rearward" and variations of these terms, or the use of other directional and orientation terms, is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. An electric motor comprising:
a housing;
a stator mounted in the housing;
a rotor mounted in the housing for rotation relative to the stator about a central axis, the rotor having first and second opposite ends and a plurality of fluid flow passages extending through the rotor between the first and second ends;
an electro-magnetic drive system operatively connected to the rotor for driving rotation of the rotor relative to the stator; and
a fluid circulation system in fluid communication with the fluid flow passages for providing fluid flow from the first end of the rotor to the second end of the rotor through at least one of the fluid flow passages and fluid flow from the second end of the rotor to the first end of the rotor through at least one other of the fluid flow passages,
wherein the fluid circulation system comprises at least one impeller mounted in the housing for rotation relative to the stator, the impeller having a peripheral edge margin, an inlet positioned radially inward from the peripheral edge margin, and an outlet positioned radially outward from the inlet, the impeller being adapted to produce at least some of said fluid flow by propelling said fluid radially outward from the inlet to the outlet when the impeller is rotated relative to the stator,
the rotor includes a plurality of openings at each of the first and second ends of the rotor, each of said fluid flow passages extending between at least one of said openings at the first end and at least one of said openings at the second end,
the circulation system further comprises a hub adjacent one of said ends of the rotor, the hub including an outward-facing surface having at least one outward-facing channel aligned with one of said plurality of openings and an inward-facing surface defining at least in part at least one conduit through the hub aligned with another of said plurality of openings, and
the impeller is positioned relative to the hub so the impeller inlet is adjacent the outward-facing channel and said inward-facing surface of the hub substantially prevents fluid flow directly to the inlet from the opening aligned with the conduit.

2. An electric motor as set forth in claim 1 wherein the passage through which the fluid flows from the first end of the rotor to the second end of the rotor is different from the passage through which the fluid flows from the second end of the rotor to the first end of the rotor.

3. An electric motor as set forth in claim 1 wherein the stator and the rotor are totally enclosed by the housing.

4. An electric motor as set forth in claim 1 wherein said fluid flow passages are substantially parallel to said central axis.

5. An electric motor as set forth in claim 1 wherein said fluid flow passages comprise helical fluid flow passages.

6. An electric motor as set forth in claim 1 wherein said flow includes fluid flow from the first end of the rotor to the second end of the rotor through multiple passages of the plurality of fluid flow passages and fluid flow from the second end to the first end through multiple other passages of the plurality of fluid flow passages.

7. An electric motor as set forth in claim 1 wherein said plurality of fluid flow passages are spaced angularly from one another about said central axis.

8. An electric motor as set forth in claim 1 wherein the housing and stator are substantially devoid of fluid flow passages in fluid communication with fluid from the fluid circulation system.

9. An electric motor as set forth in claim 1 wherein the impeller is connected to the rotor so that rotation of the rotor by the electromagnetic drive system drives the impeller to rotate relative to the stator.

10. An electric motor as set forth in claim 9 wherein the impeller is fixedly secured to the rotor.

11. An electric motor as set forth in claim 1 further comprising an output shaft fixedly secured to the rotor, the hub including an inward-facing surface having an inward-facing channel and engaging the output shaft, the inward-facing channel and output shaft together defining the conduit through the hub.

12. An electric motor as set forth in claim 1 wherein:
said at least one impeller comprises a first impeller at the first end of the rotor and a second impeller at the second end of the rotor, each of the first and second impellers having:
(a) a peripheral edge margin;
(b) an inlet positioned radially inward from the respective peripheral edge margin; and
(c) and an outlet positioned radially outward from the inlet, the first and second impellers each being mounted for rotation relative to the stator and adapted to produce at least some of said fluid flow by propelling said fluid from their respective inlets radially outward to their respective outlets when the impellers are rotated relative to the stator.

13. An electric motor as set forth in claim 12 wherein the hub is a first hub and the first hub is adjacent the first end of the rotor, the fluid circulation system further comprising a second hub adjacent the second end of the rotor, the second hub including an outward-facing surface having at least one outward-facing channel and an inward-facing surface defining at least in part at least one conduit through the second hub, each of the outward-facing channels and conduits of the second hub being aligned with and adjacent to one of said openings, the second impeller being positioned relative to the second hub so that the impeller inlets of the second impeller are adjacent the outward-facing channels of the second hub and the inward-facing surfaces of the second hub substantially prevent fluid flow from the openings aligned with the conduits through the second hub directly to the inlet of the second impeller.

14. A rotor assembly for an electric motor, the rotor assembly comprising:
a rotor having a central axis and first and second opposite ends, the rotor defining at least in part a plurality of openings at each end and a plurality of fluid flow passages between the first and second ends, each of said fluid flow passages extending between at least one of said openings at the first end and at least one of said openings at the second end;
a hub fixedly secured to the rotor adjacent one of the first and second ends, the hub including an outward-facing surface having one or more outward-facing channels and an inward-facing surface defining at least in part one or more conduits through the hub, the conduits and outward-facing channels being aligned with and adjacent a respective one of said openings; and
an impeller having a peripheral edge margin, an inlet radially inward from the peripheral edge margin, and an outlet radially outward from the inlet, the impeller being fixedly secured to at least one of the hub and the rotor and adapted to propel a fluid radially outward from the inlet to the outlet when the rotor assembly is rotated about said central axis, the impeller being positioned relative to the hub so the outward-facing channel of the hub is adjacent the impeller inlet and the inward-facing surface substantially prevents fluid flow directly to the impeller inlet from the opening aligned with the conduit.

15. A rotor assembly as set forth in claim 14 wherein the hub is a first hub, the impeller is a first impeller, and the assembly further comprises:
a second hub fixedly secured to the rotor adjacent the end of the rotor opposite the first hub, the second hub including an outward-facing surface having one or more outward-facing channels and an inward-facing surface defining at least in part one or more conduits through the second hub, the conduits and outward-facing channels of the second hub being aligned with and adjacent to a respective one of said openings; and
a second impeller having a peripheral edge margin, an inlet radially inward from the peripheral edge margin, and an outlet radially outward from the inlet, the second impeller being fixedly secured to at least one of the second hub and the rotor and adapted to propel the fluid radially outward from the inlet to the outlet when the rotor assembly is rotated about said central axis, the second impeller being positioned relative to the second hub so the outward-facing channel of the second hub is adjacent the inlet of the second impeller and the inward-facing surface substantially prevents fluid flow directly to the inlet of the second impeller from the opening aligned with said conduit.

16. A rotor assembly as set forth in claim 15 wherein the first and second hubs are rotationally oriented relative to one another so the conduit of the first hub is aligned with the outward-facing channel of the second hub and the outward-facing channel of the first hub is aligned with the conduit through the second hub.

17. A rotor assembly as set forth in claim 15 wherein said fluid flow passages establish fluid communication through the rotor between at least one of said one or more conduits through the first hub and at least one of said one or more outward-facing channels of the second hub and establish fluid communication through the rotor between at least one of said outward-facing channels of the first hub and at least one of said one or more conduits through the second hub.

18. An electric motor comprising:
a housing;
a stator mounted in the housing;
a rotor mounted in the housing for rotation relative to the stator about a central axis, the rotor having first and second opposite ends and a plurality of fluid flow passages extending through the rotor between the first and second ends, the rotor and housing being arranged so there is a first space between the rotor and housing at the first end of the rotor and a second space between the rotor and housing at the second end of the rotor;

an electro-magnetic drive system operatively connected to the rotor for driving rotation of the rotor relative to the stator; and a fluid circulation system in fluid communication with the fluid flow passages for providing fluid flow from the first end of the rotor to the second end of the rotor through at least one of the fluid flow passages and fluid flow from the second end of the rotor to the first end of the rotor through at least one other of the fluid flow passages, wherein the fluid circulation system is adapted to draw fluid into the first end of the rotor from the first space and to draw fluid into the second end of the rotor from the second space, wherein the fluid circulation system comprises at least one impeller mounted in the housing for rotation relative to the stator, the impeller having a peripheral edge margin, an inlet positioned radially inward from the peripheral edge margin, and an outlet positioned radially outward from the inlet, the impeller being adapted to produce at least some of said fluid flow by propelling said fluid radially outward from the inlet to the outlet when the impeller is rotated relative to the stator, and wherein:

the rotor includes a plurality of openings at each of the first and second ends of the rotor, each of said fluid flow passages extending between at least one of said openings at the first end and at least one of said openings at the second end, the circulation system further comprises a hub adjacent one of said ends of the rotor, the hub including an outward-facing surface having at least one outward-facing channel aligned with one of said plurality of openings and an inward-facing surface defining at least in part at least one conduit through the hub aligned with another of said plurality of openings, and the impeller is positioned relative to the hub so the impeller inlet is adjacent the outward-facing channel and said inward-facing surface of the hub substantially prevents fluid flow directly to the inlet from the opening aligned with the conduit.

\* \* \* \* \*